C. J. HOLSLAG.
METHOD OF ELECTRIC ARC WELDING, CUTTING, AND REPAIRING.
APPLICATION FILED APR. 30, 1918.
1,305,362.
Patented June 3, 1919.
2 SHEETS—SHEET 1.
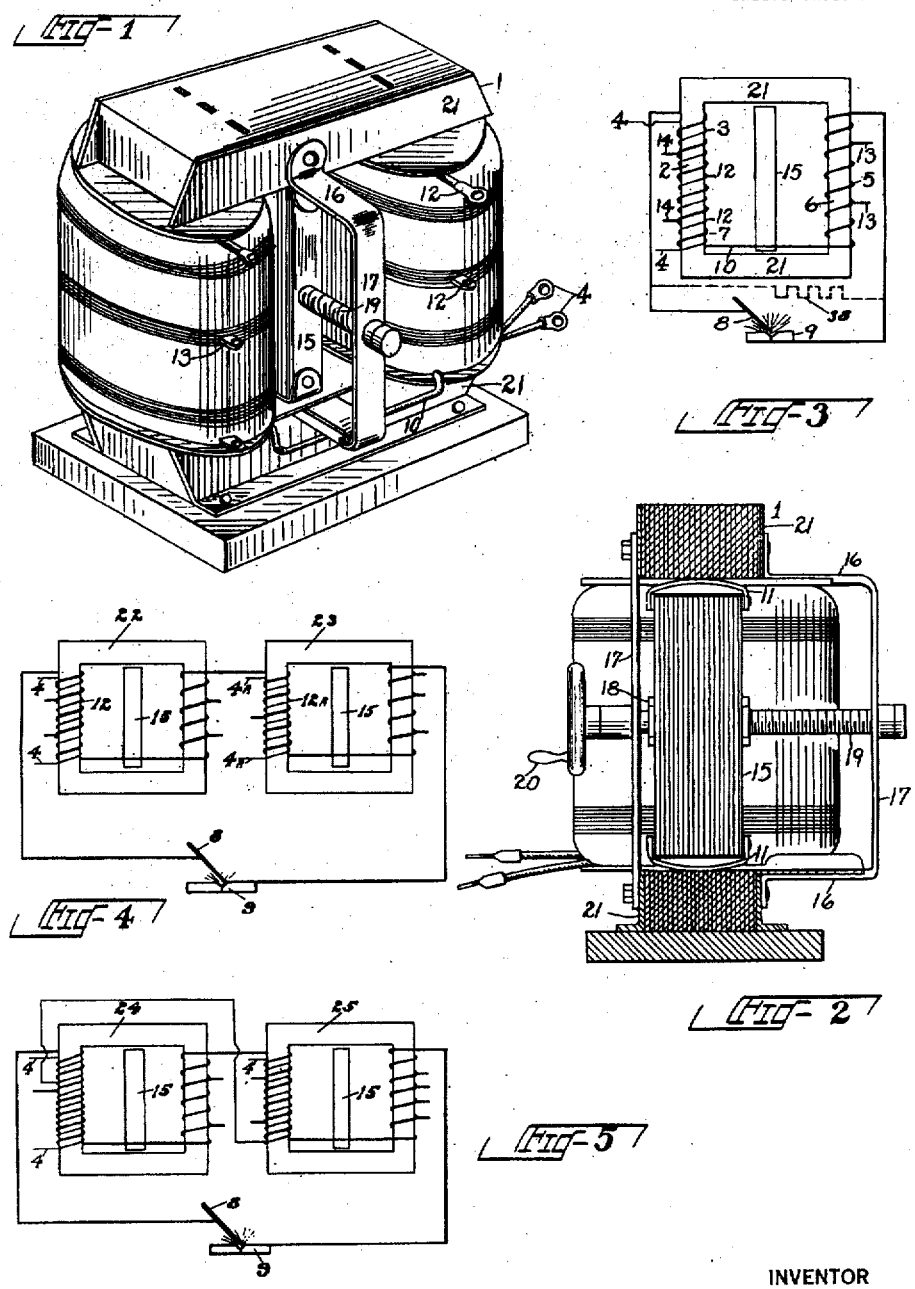
INVENTOR
CLAUDE J. HOLSLAG
BY Albion D. T. Libby
ATTORNEY C. J. HOLSLAG.
METHOD OF ELECTRIC ARC WELDING, CUTTING, AND REPAIRING.
APPLICATION FILED APR. 30, 1918.
1,305,362.
Patented June 3, 1919.
2 SHEETS—SHEET 2.
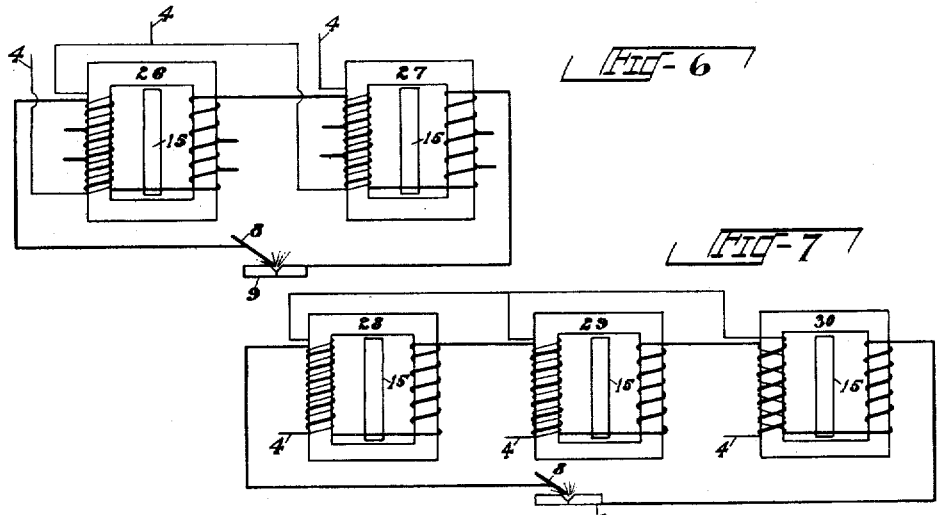
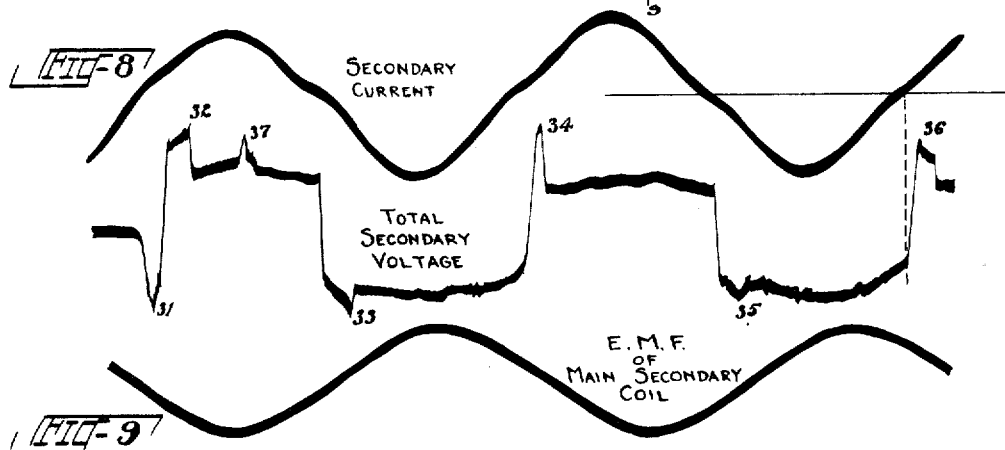
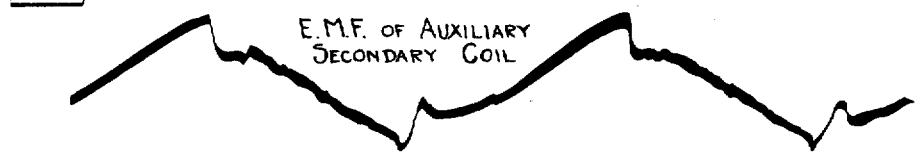
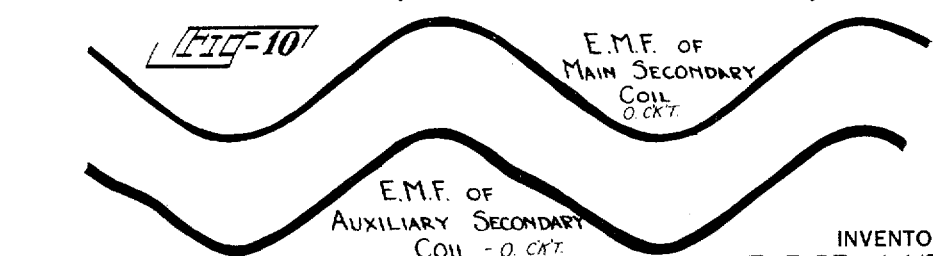
INVENTOR
CLAUDE J. HOLSLAG
BY Albion D. T. Libby
ATTORNEY

UNITED STATES PATENT OFFICE.

CLAUDE J. HOLSLAG, OF PEEKSKILL, NEW YORK.

METHOD OF ELECTRIC-ARC WELDING, CUTTING, AND REPAIRING.

1,305,362.  Specification of Letters Patent.  Patented June 3, 1919.

Application filed April 30, 1918. Serial No. 231,681.

*To all whom it may concern:*

Be it known that I, CLAUDE J. HOLSLAG, a citizen of the United States, residing at Peekskill, in the county of Westchester and State of New York, have invented certain new and useful Improvements in Methods of Electric-Arc Welding, Cutting, and Repairing, of which the following is a specification.

Broadly stated, the method of metallic arc welding, cutting and repairing consists in providing for one electrode the material to be welded, cut or repaired and for the other electrode the welding, cutting or repairing material, striking an arc between these said electrodes and maintaining this arc stable so that the work may be performed in a rapid and satisfactory manner.

In my application for an alternating current welding transformer, Serial No. 198,252, filed October 24, 1917, and my application for alternating current welding transformers, Serial No. 211,831, filed January 14, 1918, and particularly in the last mentioned application, I have shown and described transformers to be used in carrying out my method of welding or repairing by means of alternating current. Heretofore it has been the general practice to use direct current, the same being obtained when the source of power was alternating, by means of a motor-generator set or a mercury arc rectifier and reactances. The reason for the almost universal use of direct current for metallic arc welding, cutting and repairing is due to the difficulty of maintaining with alternating current a stable arc which is highly essential for efficient electric welding.

Numerous attempts have been made by others to do welding, cutting and repairing by means of alternating current but these attempts have resulted in failure or in the very limited use of a relatively high initial voltage which is cut down, and an attempt made at regulation, by means of resistances and inductances, all of which is exceedingly wasteful in power consumption, and furthermore limited to the use of slag covered electrodes in an attempt to confine the gases formed around the arc to maintain it, but a weld so made is "lumpy" porous and "spongy" and not satisfactory. In my applications above referred to, I have shown and described an alternating current transformer or a combination of transformers which I refer to broadly herein as a transforming device in which the current used for welding, cutting and repairing is delivered directly from the terminals of the transforming device at the voltage of the arc and which will weld with either bare or covered electrodes, and so far as I am aware, I am the first to produce a successful apparatus or method of metallic arc welding, cutting and repairing, whether the apparatus delivers alternating current or direct current, in which, the arc voltage is delivered at the terminals of the machine.

It is generally understood that with direct current the positive electrode develops greater heat than the negative electrode which is very objectionable and I have found after a long study of this subject that the alternating or reciprocating arc possesses many advantageous features over the direct current arc and gaseous flames, such as oxy-acetylene, in that the alternating or reciprocating arc has a far greater penetrating power and more uniform heating effect with the same amount of energy consumed at the arc and that, due to the greater agitation of the molten metal a more homogeneous weld is made. In fact, after a weld is made by my method of welding, the material will break elsewhere rather than at weld when put under stress.

After a long study and many tests, I have found:—

First: That the welding transformer or transforming device should deliver a constant rate of energy at the arc in order to get the greatest localized uniform heating effect. That is, for a given instant, if the volts increase the current should decrease and vice versa or the phase angle may be caused to shift.

Second: The control of the energy should be automatic within the machine itself and should cover wide limits to suit the various classes of work and various sizes and classes of electrodes.

Third: That the transformer or transforming device should have a quick acting puncture or guardian voltage on open circuit or tendency to open circuit which would be caused by the presence of dirt, oil, slag, etc., in the metals to be welded, cut or repaired; that is to say, where a slag covered electrode is used, or dirt or oil be on the metal or material to be welded or repaired and this foreign matter gets in the way, tending to put out the arc or open the circuit, this puncture or guardian voltage should be present to act instantaneously to break through or push out of the way the foreign matter.

Fourth: That the puncture or guardian voltage should be readily adjustable for any particular piece of work at hand, such adjustment being made by carrying the voltage taps on both the primary and secondary windings as well as a quick adjustment either manual or automatic of the flux paths through both primary and secondary windings.

Fifth: That the transformer or transforming device should be capable of quick current or voltage adjustment to apply the welding or repair metal in any one of the following ways: "burnt in" or penetrated, "laid on" or padded, "smoothed over" or for finishing in any position, horizontal, vertical or overhead.

Sixth: That the transformer or transforming device, while possessing all of the above mentioned features and characteristics and others which will occur to an expert welder, should be small and compact so as to be readily portable and have an electrical efficiency far greater than welding apparatus now on the market and have a greater speed in welding, that is to say, pounds of material deposited per hour to be greater than in present known machines or methods.

The principal object, therefore, of my invention is to provide a method of metallic arc welding, cutting and repairing which accomplishes all of the above features set forth, as well as others which will be apparent to one skilled in the art.

In order to illustrate my method of metallic arc welding, cutting and repairing and to make the same clearly understood within the scope of this application, I have incorporated herein the drawings of my two previous applications, hereinbefore referred to, and in addition I have shown the characteristics of one of my transformers or transforming device from which the commercial success of my invention will be readily understood.

Since the subject matter of this application is based on my two previous applications above referred to, the descriptive matter, particularly of the second mentioned application will be used herein.

In the drawings, Figure 1 is a perspective view of one form of transforming device.

Fig. 2 is a vertical sectional view, particularly showing the means for adjusting the position of the flux diverter.

Fig. 3 is a diagrammatic view, showing the disposition of the windings employed.

Fig. 4 illustrates diagrammatically a transforming device consisting of two transformers adapted to be connected to a two phase circuit.

Fig. 5 illustrates diagrammatically a transforming device consisting of two transformers adapted to be connected to a three phase circuit with the well known "Scott" connection, three to two phase and two phase to single phase, as in Fig. 4.

Fig. 6 illustrates diagrammatically a transforming device consisting of two transformers adapted to be connected in open delta three phase circuit.

Fig. 7 illustrates diagrammatically a transforming device consisting of two transformers adapted to be connected to a three phase power circuit with one phase reversed so that the total secondary voltage is substantially twice the voltage of any one transformer.

Fig. 8 is a reproduction of an oscillograph record showing the secondary current and secondary or arc voltage from a machine similar to that illustrated in Figs. 1, 2 and 3.

Fig. 9 is a reproduction of an oscillograph record of the E. M. F. generated in the main and auxiliary secondary coils but with a different oscillograph sensitiveness than the curve in Fig. 8.

Fig. 10 is a reproduction of an oscillograph record showing the E. M. F. of the main and auxiliary secondary coils on open circuit.

Referring now to the details, wherein like numbers refer to corresponding parts in the various views; in Figs. 1, 2 and 3, 1 represents a core, which is preferably laminated, and, as shown, is of the closed circuit type. Located on the leg 2 of the core is a primary winding 3, designed to be suitably connected through its terminals 4 with a source of alternating current of electricity. Arranged on another leg 6 of the core, remote from the leg 2, is a portion 5 of a secondary winding, which portion I term the secondary auxiliary coil, the functions of which will be later pointed out. A second portion 7 of the secondary winding is arranged on the leg 2 and the convolutions thereof are preferably intimately associated or co-mingled with those of the primary winding. This portion of the secondary winding, I term the main secondary coil. I have found in practice that a close association of the main secondary coil with the primary winding is highly essential, due to the magnetic leakage between the primary winding and the main secondary coil being reduced to a minimum, thereby providing a steady voltage and power current from the coil. The terminals of the secondary winding, which includes both the main and auxiliary coils above referred to, are connected one to a welding, cutting or repair electrode 8 and the other to the material 9 to be welded, cut or repaired.

In the construction of the transforming device each of the windings employed is provided at one or more intermediate points with taps which, by suitable connections, permit the use of the whole of each winding or of any desired portion thereof, in order that the best conditions may be obtained to meet the requirements for welding, cutting or repairing different metals, either when clean or when having dirt, grease, oil, slag or the like on the parts to be operated upon. To this end the primary coil 3 is provided with taps 12 by the use of which, such connection may be made with the source of current as to increase or diminish the number of the effective windings of the coil. The auxiliary secondary coil 5 has in it the taps 13, and the main secondary coil is provided with taps 14 thereby allowing variations in the number of turns of each of said coils whereby the voltage relation of one coil to the other and to the work may be quickly adjusted.

Interposed between the legs of the core is a flux diverter 15, which, in the form of transforming device shown, is composed of a laminated bar of a length slightly less than the distance between the transverse portions 21 of the core. In order that the flux diverter may be moved to any desired position relative to the transverse portions of the core to wholly or partially close the magnetic circuit, or to be moved out of line with such portions and to have no effect on such circuit, it is mounted on a frame consisting of the arms 16 secured to the transverse portions of the core and connecting bars 17 secured to the outer ends of the arms. The flux diverter has in it an opening containing a nut 18 and receiving the screw 19. The ends of the screw are connected to the bars 17 in a manner to allow of the screw being freely rotated and to be retained against longitudinal movement. Attached to one end of the screw is a handle 20 for convenience in turning the screw, and by the use of which the flux diverter may quickly be moved to occupy the desired position relative to the core. Secured to each end of the bar 15 is an outwardly extending brass spring 11, which springs, bear upon the inner faces of the respective transverse portions of the core. The frictional contact between the screw and the nut 18 and that of the springs on the core are sufficient to retain the flux diverter in any position in which it may be placed against movement by reason of attraction exerted upon it when currents pass through the coils on the core. It is apparent that these details of mechanical construction may be varied over wide limits; for example, when high initial starting voltage and current is required with immediate sinking to a steady lower working value, the diverter may be arranged to work automatically by being mounted on suitable guides and controlled by the magnetic flux acting on the diverter against a spring and dash pot.

In the arrangement shown in Fig. 4, two transformers 22 and 23 are illustrated, similar to that shown in Fig. 3, but arranged to be connected to a two phase circuit; that is, the primary 12 of transformer 22 is adapted to have its terminals 4—4 connected to one phase and the transformer 23 is adapted to have its terminals 4ᵃ—4ᵃ connected to the other phase. Each primary may have one or more taps 12 or 12ᵃ, same as in Fig. 3. The secondaries may also have any suitable number of taps. It will be understood that instead of two independent transformers as shown, they may be combined into an integral structure.

In Fig. 5, two transformers 24 and 25 are illustrated somewhat similar to that in Fig. 4 but the primary windings have terminals 4 which are adapted to be connected to a three phase power supply circuit, the arrangement giving a three phase to two phase to single phase, the secondary coils all being connected in series with suitable taps as described in previous arrangements.

In Fig. 6, two transformers 26 and 27 are illustrated with their primary terminals 4 adapted to be connected in an open delta connection to a three phase circuit.

In Fig. 7 three transformers 28, 29 and 30 are illustrated having the terminals 4 of their primary windings adapted to be connected to a three phase circuit. It will be noted that the primary of the transformer 30 is reversed and the secondary coils are all connected in series. With this arrangement, I find that the secondary voltage is twice the voltage in any one of the transformers. This method of connecting transformers for metallic arc welding, I believe to be new and unique.

In considering the method of operation of the special transformers or transforming devices hereinabove described, I have made oscillograph records which I have reproduced in the drawings as Figs. 8, 9 and 10. The curves shown in these figures were taken from a machine similar to that shown in Figs. 1, 2 and 3, however, I have taken oscillograph records from the other arrangements; for example, that shown in Fig. 5, and found them to correspond very closely to the curves above referred to. In Fig. 10 the upper curve is the E. M. F. curve of the main secondary coil on open circuit, that is, without any arc being drawn between the electrode 8 and the work 9. The lower curve in Fig. 10 is the E. M. F. of the auxiliary coil on open circuit. It is seen that these curves are practically alike and are in phase, however, just as soon as the arc was struck between the welding electrode and the material to be welded the E. M. F. curve of the auxiliary secondary coil under the welding condition imposed, immediately shifted 180 degrees and changed its character as shown by the lower curve of Fig. 9. The E. M. F. curve of the main secondary coil which is interlinked with the primary winding retained its shape and position. The shifting under load of the E. M. F. of the auxiliary secondary coil both in phase and character to an extent depending on the load has in itself a regulating effect and is in part explained by the fact that the auxiliary secondary coil is remote from the primary and all of the flux generated by the primary does not pass through the remote portion of the secondary on account of normal flux leakage and the leakage due to the diverter which was part way in when the oscillograph records were made. That leg of the core surrounded by the auxiliary secondary coil not being magnetized to the extent that the leg surrounded by the primary and main secondary coil, is highly responsive to flux changes and hence will generate a voltage that responds immediately to conditions of the arc and which I term a puncture or guardian voltage which is superimposed on the main coil voltage to give a resultant or effective voltage delivered by the secondary winding as indicated by the lower curve of Fig. 8, the curve being marked "Total secondary voltage" while the current in the secondary winding is shown by the upper curve in Fig. 8. An inspection of the total voltage curve shows that the voltage across the arc changes rapidly from a positive to a negative maximum and vice versa. That is, to say, at the time when the resultant current in its cycle is passing through zero the voltage across the arc is at a maximum value which remains substantially constant under constant conditions of the arc, or is at the point of shifting almost instantaneously to a maximum value in the opposite direction. The regulating features of the auxiliary secondary coil are indicated by the peaks marked 31 to 36 inclusive on the total secondary voltage curve wherein the voltage tends to rise across the arc as the current passes through zero, but the building up of the current to its maximum value quickly suppresses the rise in voltage and a substantially constant voltage is thereby maintained so long as the physical conditions remain constant, but particular attention is called to point 37 in this curve as it shows further the regulating or guardian effect of the auxiliary secondary coil to supply instantaneously the additional voltage required to penetrate the oil, slag, dirt and other foreign material which may be present at the weld.

It will be apparent by an examination of these curves why ordinary transformers cannot be used for alternating current metallic arc welding, the trouble being in such transformers that the effective voltage across the arc does not change from one maximum to the other with sufficient rapidity to stabilize or maintain the arc. Furthermore due to the reactions in my transformers the current in the primary does not rise to a detrimental value when the electrodes are short circuited as they are when the arc is struck, as it does in an ordinary power transformer. It is of interest to note at this point that an alternating current voltmeter connected across the terminals of the secondary coils at the time when these oscillograph records were obtained showed the following readings:— Fig. 10 E. M. F. of main secondary coil 57 volts; E. M. F. of auxiliary secondary coil 52 volts. Fig. 9 E. M. F. of main secondary coil, 52 volts; E. M. F. of auxiliary secondary coil, 47 volts, while the total secondary voltage of Fig. 8 shown by the voltmeter was from 26 to 29. These readings of themselves indicate a phase displacement of the voltages generated by the two coils and the curves show graphically what takes place under one set of conditions. It is also to be noted that the secondary current and effective voltage, for the conditions imposed at the time which was in welding two pieces of steel together with a certain size electrode, are substantially in phase giving a condition in which the secondary power is equal to the product of volts and amperes.

By the use of taps in the primary coil, and of those in the different parts of the secondary coil, and the adjustment of the flux diverter, conditions can quickly be arrived at to permit the use of an alternating electric current for cutting, welding or repairing steel, cast iron, copper, aluminum and other metals heretofore difficult or impossible of commercial welding or repairing when using either bare or slag covered electrodes. When by the means described the best electrical conditions for welding, cutting or repairing are arrived at, such conditions are automatically maintained, as the voltage of the secondary due primarily to the auxiliary secondary coil, varies instantaneously to counteract increased drop, presence of dirt, oil, slag, etc., thus holding the power at the arc substantially constant during the operation of welding, cutting or repairing, it being understood that the secondary current is of substantial average constant value for a given physical condition, setting of the transforming device, and a given size electrode. This secondary voltage can be varied to accommodate two or more arcs in series and when so adjusted it is advisable to use a non-inductive resistance across the secondary, as shown in dotted lines at 38, Fig. 3; to take the back E. M. F. or "kick" voltage when the arc is ruptured; or a third leg of small cross section may be provided on the transformer remote from the other two legs and having a suitable number of secondary turns wound thereon in reverse direction to the other two legs so that little or no opposition to the current is offered when welding is going on but on the instant of opening the circuit at either arc this third leg develops a voltage in value and phase sufficient to hold down the total "kick" voltage to a safe limit.

After the proper adjustment of the transformer parts, as above described, an increased current passing through the primary coil, in consequence of lowering the resistance in the secondary circuit, will result in the increase of the magnetism of that part of the core which is in the primary coil. The consequent increase in the current in that part of the secondary coil located remote from the primary will result in an increased production by it of magnetic lines to oppose those emanating from that part of the core on which the primary is located, thus aiding in limiting and regulating the secondary current. The additional magnetism produced by the increase in current in the secondary circuit, while having a desirable effect in tending to stabilize the primary current, does not act with sufficient force to meet all the requirements in a circuit when a manually-held welding or cutting tool is included. It is for the purpose of obtaining the necessary force and certainty of action on the primary that I comingle a part of the secondary with it. When there is a tendency to induce a current in excess of that found to be best adapted for the work being done in the secondary circuit, that portion of the secondary coil which is interwound with the primary coil develops additional magnetic lines of force which act in opposition to the flow of the primary current, retarding it sufficiently to establish the conditions first determined upon as suited for the work.

As a result of the automatic control of the current both in the primary and secondary by the means described, by which the volts and amperes compensate each other, that is if the operator lengthens the arc slightly, the volts go up and the current drops or vice versa, the secondary can be connected directly to the work and to a welding, cutting or repairing tool, avoiding the interposition of resistances or impedances in the secondary circuit and the resulting large waste of power and bare or covered electrodes can be used and the heat delivered to the arc is thus maintained substantially constant, within ordinary limits, irrespective of the lengthening or shortening of the arc by reason of the movement of the welding or repair electrode resulting from the fact that the same is manually held or due to other physical conditions.

While I have shown and described in detail a preferred form of my invention and the method in which the same operates in practice, I do not wish to be limited to the details of construction and other methods of application except as set forth in the appended claims.

Having thus described my invention what I claim is:—

1. The method of welding, cutting and repairing by electric current wherein the metal to be welded, cut or repaired constitutes an electrode and the welding, cutting or repairing metal constitutes an opposite electrode, consisting in transforming an alternating current so that when the transformed current is passed through the said electrodes on drawing an arc, the effective E. M. F. across the arc passes suddenly from a prolonged maximum value of one polarity to a prolonged maximum value of another polarity, whereby the arc is stabilized and sustained during welding, cutting or repairing.

2. The method of cutting, welding and repairing by alternating current, wherein the material to be cut, welded or repaired constitutes an electrode and the cutting, welding or repairing material constitutes an opposite electrode, consisting in transforming directly the alternating current and passing it to said electrodes so that the E. M. F. across the arc produced by the separation of said electrodes is the resultant of at least two voltages, one of which is quicker than the other component or components to respond to changes in the cutting, welding or repairing conditions.

3. The method of electric arc cutting, welding and repairing by alternating current energy, which consists in supplying alternating current energy, transforming said alternating current energy directly into another form in which the voltage factor is a composite one, and operating a movable electrode in close proximity to the material to be cut, welded or repaired, said material constituting an opposite electrode, and passing the transformed energy through said electrodes, whereby a persistent arc is formed and the heat thereof maintained substantially constant by reason of said composite voltage factor.

4. The method of cutting, welding and repairing by alternating current, wherein the material to be cut, welded or repaired constitutes an electrode and the cutting, welding or repairing material constitutes an opposite electrode, consisting in transforming directly the alternating current so that a plurality of voltages is obtained, then shifting the phase relation of these voltages by striking an arc between said electrodes whereby a resultant E. M. F. is obtained across the said arc and sustaining said arc by said resultant E. M. F. within ordinary limits during the cutting, welding or repairing operations.

5. The method of welding, cutting and repairing by electric current wherein the metal to be welded, cut or repaired constitutes an electrode and the welding, cutting or repairing metal constitutes an opposite electrode, consisting in directly transforming an alternating current and producing E. M. F.'s of different characteristics so that when the arc is struck by passing the current through said electrodes an effective E. M. F. is obtained which reciprocates across the arc with a sudden change between substantial maxima of different polarity.

6. The method of welding, cutting and repairing by electric current wherein the metal to be welded, cut or repaired constitutes an electrode and the welding, cutting or repairing metal constitutes an opposite electrode, consisting in directly transforming an alternating current and producing voltages of different characteristics so that after the arc has been struck by passing the transformed current through said electrodes one of these voltages acts as a puncture voltage for the arc whereby the same is maintained stable in the presence of dirt, oil, slag, etc., as described.

7. The method of electric arc cutting, welding and repairing by alternating current, which consists in supplying alternating current having a certain E. M. F. wave form, converting said alternating current directly into another alternating current and controlling said converted current by an E. M. F. having a wave form different from the first and which will sustain an alternating arc between the material to be cut, welded or repaired, and a movable electrode.

8. The method of electric arc cutting, welding and repairing by alternating current, which consists in supplying alternating current having a certain E. M. F. wave form, converting said alternating current directly into another alternating current and controlling said converted current by an E. M. F. having a wave form different from the first and which will sustain an alternating arc between the material to be cut, welded or repaired, and a movable electrode, and absorbing the back E. M. F. or kick voltage if the arc is ruptured, and limiting the puncture voltage generated at this time.

9. The method of welding, cutting and repairing by electric current wherein the metal to be welded, cut or repaired constitutes an electrode and the welding, cutting or repairing metal constitutes an opposite electrode, consisting in transforming directly an alternating current of one kind into a second current, passing said second current through said electrodes, said second current having a working E. M. F. established when the current is passed through the electrodes, and equal to that across the arc.

10. An alternating current system for electric arc cutting, welding and repairing comprising an arc cutting, welding or repairing circuit in which the material to be cut, welded or repaired constitutes one electrode and the cutting, welding or repairing material constitutes the opposite electrode, a transformer for supplying current directly to said circuit having preferably a closed circuit core constructed to provide a plurality of flux paths, and primary and secondary windings arranged on said core so as to control the flux distribution in said flux paths according to the electrical requirements of said welding circuit.

11. An alternating current system for electric arc cutting, welding and repairing comprising an arc cutting, welding or repairing circuit in which the material to be cut, welded or repaired constitutes one electrode and the cutting, welding or repairing material constitutes the opposite electrode, a transformer for supplying current to said circuit having preferably a closed circuit core, and primary and secondary windings arranged on said core so that when said electrodes connected directly to the secondary terminals are brought together and then separated within reasonable limits an arc is established and maintained by the secondary E. M. F. then impressed across the arc.

12. An alternating current system for electric arc cutting, welding and repairing comprising an arc cutting, welding or repairing circuit in which the material to be cut, welded or repaired constitutes one electrode and the cutting, welding or repairing material constitutes the opposite electrode, a transformer for supplying current to said circuit having preferably a closed circuit core, and primary and secondary windings on said core, said secondary winding being arranged in two parts which co-act to deliver substantially a constant product of voltage and current at the arc.

13. An alternating current system for electric arc cutting, welding and repairing comprising an arc cutting, welding or repairing circuit in which the material to be cut, welded or repaired constitutes one electrode and the cutting, welding or repairing material constitutes the opposite electrode, a transformer for supplying current directly to said circuit having preferably a closed circuit core constructed to provide a plurality of flux paths, primary and secondary windings arranged on said core said secondary winding being arranged in two parts, one associated with the primary and the other on a part of the core remote from the first part and primary, with means associated with said secondary parts for assisting in controlling the flux distribution in said flux paths according to the electrical requirement of said welding circuit.

14. An alternating current system for electric arc cutting, welding and repairing, comprising an arc cutting, welding or repairing circuit in which the material to be cut, welded or repaired constitutes one electrode and the cutting, welding or repairing material constitutes the opposite electrode, a transformer for supplying current to said circuit and having a magnetizable core, primary and secondary windings so disposed on said core that the secondary winding, connected in said circuit, delivers its power at the voltage of the arc.

In witness whereof, I affix my signature.

CLAUDE J. HOLSLAG.